United States Patent Office 2,930,824
Patented Mar. 29, 1960

2,930,824

CERTAIN N,N'-DISUBSTITUTED ETHYLENEBIS-BENZOTHIAZOLESULFENAMIDES

Norman K. Sundholm, Middlebury, Conn., assignor to United States Rubber Company, New York, N.Y., a corporation of New Jersey No Drawing. Application May 15, 1958
Serial No. 735,373

5 Claims. (Cl. 260—788)

This invention relates to new compositions of matter which are useful as accelerators for the vulcanization of rubber and other vulcanizable rubberlike substances. Further, they have the useful property of showing good resistance to scorch, that is, they have little tendency to cause incipient vulcanization of conventional rubber stocks during processing.

This application is a continuation-in-part of my application Serial No. 636,883, filed January 29, 1957, now abandoned.

When a rubber stock, including vulcanizing agent, accelerator, and other compounding ingredients, is mixed and shaped, said stock is at an elevated temperature, usually in the 240° F.–270° F. range. Depending upon the nature of the rubber, the compounding ingredients, and the temperature, undesired vulcanization may take place. This is a serious problem because the partially vulcanized rubber stock is no longer plastic and cannot be shaped into the desired form. The partially vulcanized (scorched) stock may in certain cases be reworked for further use, but this is a time-consuming and an extra-cost practice. If the vulcanization has gone too far, the stock must be scrapped, resulting in an economic loss.

The scorch problem has become of increasing acuteness in the rubber industry due principally to the increased use of the activating furnace blacks as reinforcing agents and the employment of higher processing temperatures resulting from increased productivity. This problem has been solved to a large extent by the application of accelerators having more delayed action than 2-mercaptobenzothiazole and benzothiazolyl disulfide, but there is need for further improvement.

It is an object of this invention to provide new compositions of matter which are useful as accelerators for the vulcanization of rubber and other vulcanizable rubberlike substances, and which show especially good resistance to scorch. It is a further object to provide a method for vulcanizing sulfur-vulcanizable rubbers in the presence of said new compositions of matter. Other objects will appear from the description of the invention which follows.

The new accelerators of this invention comprise the N,N'-ethylenebis(N-substituted 2-benzothiazolesulfenamides) represented by the structural formula

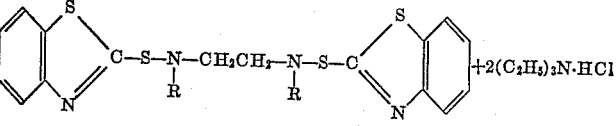

where R is a member of the group consisting of isopropyl, tert-butyl, and cyclohexyl radicals, the two R's being alike.

In U.S. Patent No. 2,339,552, which issued on January 18, 1944, to Edward L. Carr, the preparation and accelerating properties of the unsubstituted compound, that is, where R is hydrogen in the above formula, are reported. It will be shown below that the new accelerators of this invention have markedly more delayed action than the accelerator of the Carr reference and therefore can be used as accelerators in scorchy rubber stocks in which Carr's compound could be used only with difficulty.

The new accelerators are readily prepared by the reaction of two moles of 2-benzothiazolesulfenyl chloride with one mole of the corresponding N,N'-disubstituted ethylenediamine in the presence of two moles of an aliphatic tertiary amine such as triethylamine according to the equation

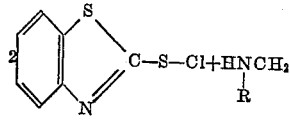 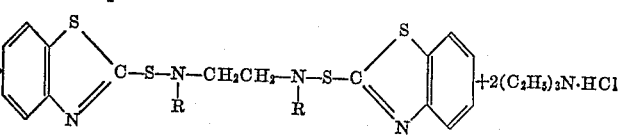

The 2-benzothiazolesulfenyl chloride used is prepared by the chlorination of benzothiazolyl disulfide in a suitable organic solvent according to U.S. Patent No. 2,257,974, which issued to William E. Messer on October 7, 1941. The N,N'-disubstituted ethylenediamines are prepared by the reaction of an excess of the corresponding primary amine with ethylene bromide using the procedure of W. R. Boon, Journal of the Chemical Society, 1947, 307.

The preparation and properties of the new accelerators are as follows:

*Example 1.—N,N'-ethylenebis(N-isopropyl-2-benzothiazolesulfenamide)*

A solution of 2-benzothiazolesulfenyl chloride was prepared by the treatment of a stirred suspension of 68 grams of technical benzothiazolyl disulfide in 500 ml. of anhydrous ethylene chloride with 14.5 grams of chlorine. This solution was added dropwise to a stirred solution of 28.8 grams of N,N'-diisopropylethylenediamine and 42.4 grams of triethylamine in 100 ml. of anhydrous ethylene chloride during 70 minutes. The temperature of the reaction mixture was kept at 18° C.–22° C. during the addition. After one-half hour of stirring following completion of the addition, the mixture was filtered and the triethylamine hydrochloride was washed with two 100-ml. portions of ethylene chloride. The wash was added to the filtrate and the ethylene chloride was removed. The residual product was purified by recrystallization from ethanol using decolorizing carbon to give colorless crystals melting at 137° C.–137.5° C.

*Analysis.*—Calculated for $C_{22}H_{26}N_4S_4$: N, 11.81. Found: N, 11.75.

The remaining accelerators were prepared using the above procedure.

*Example 2.—N,N'-ethylenebis(N-tert-butyl-2-benzothiazolesulfenamde)*

This compound, prepared from N,N'-tert-butyl-ethylenediamine, 2-benzothiazolesulfenyl chloride, and triethylamine, was purified by recrystallization from ethylene chloride using decolorizing carbon to give colorless crystals melting at 203° C.–204° C.

*Analysis.*—Calculated for $C_{24}H_{30}N_4S_4$: N, 11.16. Found: N, 10.93.

*Example 3.—N,N'-ethylenebis(N-cyclohexyl-2-benzothiazolesulfenamide)*

This compound, prepared from N,N'-dicyclohexylethylenediamine, 2-benzothiazolesulfenyl chloride, and triethylamine, was purified by recrystallization from ethanol to give colorless crystals melting at 172° C.–173° C.

*Analysis.*—Calculated for $C_{28}H_{34}N_4S_4$: N, 10.11. Found: N, 9.85.

To demonstrate the utility of the new compositions of this invention as delayed action accelerators, they were compared with Carr's accelerator, i.e., N,N'-ethylenebis-(2-benzothiazolesulfenamide), the methyl and ethyl derivatives thereof, 2-mercaptobenzothiazole, and benzothiazolyl disulfide in the following formula.

|  | Parts by weight |
|---|---|
| Smoked sheet | 100 |
| Furnace black | 45 |
| Zinc oxide | 5 |
| Zinc salts of cocoanut oil acids | 3.5 |
| Pine tar | 3.5 |
| Antioxidant [1] | 2.0 |
| Sulfur | 2.25 |
| Accelerator | 0.5 |

[1] Equal parts of BLE (an acetone-diphenylamine condensate) and Flexamine (a mixture of diphenyl-p-phenylenediamine and the reaction product of formaldehyde and BLE).

Stocks were compounded containing as the accelerator the following:

| Stock | Accelerator |
|---|---|
| A | 2-Mercaptobenzothiazole. |
| B | Benzothiazolyl disulfide. |
| C | N,N'-Ethylenebis(2-benzothiazolesulfenamide). |
| D | N,N'-Ethylenebis(N-methyl-2-benzothiazolesulfenamide). |
| E | N,N'-Ethylenebis(N-ethyl-2-benzothiazolesulfenamide). |
| F | N,N'-Ethylenebis(N-isopropyl-2-benzothiazolesulfenamide). |
| G | N,N'-Ethylenebis(N-tert-butyl-2-benzothiazolesulfenamide). |
| H | N,N'-Ethylenebis(N-cyclohexyl-2-benzothiazolesulfenamide). |

The stocks were cured by heating in a press at 274° F. using curing times of 30 and 90 minutes. The physical properties of the respective stocks at the respective curing times are given in the following table.

| Stock | Cure Time, min. | 300% Modulus, p.s.i. | Tensile Strength, p.s.i. | Elongation at Break, percent |
|---|---|---|---|---|
| A | 30 | 1,370 | 3,640 | 560 |
| B | 30 | 1,370 | 3,920 | 590 |
| C | 30 | 1,700 | 4,270 | 570 |
| D | 30 | 1,650 | 4,530 | 580 |
| E | 30 | 1,530 | 4,270 | 600 |
| F | 30 | 1,440 | 4,250 | 600 |
| G | 30 | 1,330 | 4,030 | 610 |
| H | 30 | 1,430 | 4,120 | 600 |
| A | 90 | 1,830 | 3,950 | 510 |
| B | 90 | 1,800 | 4,390 | 560 |
| C | 90 | 1,900 | 4,330 | 550 |
| D | 90 | 1,930 | 4,390 | 550 |
| E | 90 | 1,790 | 4,350 | 560 |
| F | 90 | 1,890 | 4,330 | 540 |
| G | 90 | 1,810 | 4,130 | 540 |
| H | 90 | 1,770 | 4,300 | 560 |

These data show that the new compositions of matter are good accelerators.

In order to demonstrate the scorch resistance of the new accelerators, the Mooney scorch times of these stocks were determined on the Mooney viscometer at 250° F. (per ASTM Method D1077–55T). The scorch time was measured from the time the viscometer was closed until the viscosity had increased three points above the minimum reading; the small rotor was used in obtaining the following data.

| Stock: | Scorch time (min.) |
|---|---|
| A | 15 |
| B | 21 |
| C | 20 |
| D | 19 |
| E | 24 |
| F | 36 |
| G | 40 |
| H | 36 |

The scorch times show that the new accelerators (contained in stocks F, G, and H) have markedly superior delayed action compared to Carr's unsubstituted compound, the methyl and ethyl derivatives thereof, 2-mercaptobenzothiazole, and benzothiazolyl disulfide, since the longer the scorch time the greater the delayed action of the accelerator. The difference in favor of the accelerators of this invention is represented by a factor on the order of 100 percent. Because of this large improvement in delayed action, the new accelerators will permit the user to process his rubber stocks at higher temperatures and, therefore, to process more compounded rubber in a given length of time than if Carr's accelerator or another of the tested accelerators is used.

The new accelerators may be used to accelerate the vulcanization of any of the natural or synthetic rubbers which ordinarily lend themselves to cure with sulfur or other curing agent susceptible to acceleration, and which include among others the prominent rubbery polymers derived from 1,3-butadiene, such as copolymers of butadiene with styrene or acrylonitrile. Polybutadiene and polyisoprene rubbers and copolymers of isobutylene and a diolefin are other examples.

The new accelerators may be used in combination with other compounding ingredients than the ones shown here. These include acceleration activators and retarders, other reinforcing agents, softeners, antioxidants, and the like to produce various types of rubber compounds.

Having thus described my invention, what I claim and desire to protect by Letters Patent is:

1. Compounds represented by the structural formula

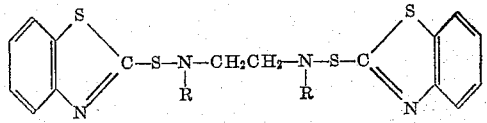

where R is a member of the group consisting of isopropyl, tert-butyl, and cyclohexyl radicals.

2. N,N' - ethylenebis(N - isopropyl - 2 - benzothiazolesulfenamide).

3. N,N' - ethylenebis(N - tert - butyl - 2 - benzothiazolesulfenamide).

4. N,N' - ethylenebis(N - cyclohexyl - 2 - benzothiazolefenamide).

5. A method of vulcanizing sulfur-vulcanizable rubbers which comprises vulcanizing the same in the presence of a compound as set forth in claim 1.

References Cited in the file of this patent

UNITED STATES PATENTS

| 2,050,198 | Sebrell | Aug. 4, 1936 |
| 2,382,793 | Howland | Aug. 14, 1945 |
| 2,762,814 | Lunt | Sept. 11, 1956 |
| 2,766,237 | D'Amico | Oct. 9, 1956 |
| 2,776,297 | Cherlow et al. | Jan. 1, 1957 |

FOREIGN PATENTS

| 642,597 | Great Britain | Sept. 6, 1950 |